United States Patent [19]

Krüger et al.

[11] Patent Number: 4,610,607
[45] Date of Patent: Sep. 9, 1986

[54] STEERING ASSISTANCE PUMP

[75] Inventors: Heinz Krüger, Usingen; Heinz Teubler, Friedrichsdorf; René Schulz, Neu-Anspach; Erwin Stäemmler, Kronberg, all of Fed. Rep. of Germany

[73] Assignee: Vickers Systems GmbH, Bad Homburg, Fed. Rep. of Germany

[21] Appl. No.: 706,150

[22] Filed: Feb. 27, 1985

[30] Foreign Application Priority Data

Mar. 3, 1984 [EP] European Pat. Off. ...... 84 102 295.7

[51] Int. Cl.$^4$ ............................................. F04C 15/02
[52] U.S. Cl. ..................................... 417/292; 417/304
[58] Field of Search ............... 417/292, 310, 302, 304; 236/102

[56] References Cited

U.S. PATENT DOCUMENTS

| | | | |
|---|---|---|---|
| 1,401,944 | 12/1921 | Halvorsen | 417/292 |
| 1,715,950 | 6/1929 | Robertshaw | 236/102 |
| 4,470,768 | 9/1984 | Konz | 417/310 |

FOREIGN PATENT DOCUMENTS 55-96387  7/1980  Japan .................................. 417/292

*Primary Examiner*—Richard E. Gluck
*Attorney, Agent, or Firm*—Barnes, Kisselle, Raisch, Choate, Whittemore & Hulbert

[57] ABSTRACT

A steering assistance pump includes a temperature sensor valve which communicates with an inlet duct of the pump by way of an additional, normally closed outlet passage. When a pressure relief valve responds, upon blocking of the servo steering means, the temperature of the hydraulic fluid in the system increases to such a degree that it exceeds the limit value of the temperature sensor valve. The valve thus opens to cause the pilot control pressure in the control chamber of the pressure relief valve to be reduced, whereby the pump pressure itself is also reduced.

14 Claims, 5 Drawing Figures

STEERING ASSISTANCE PUMP

BACKGROUND OF THE INVENTION

The present invention relates generally to a pump, more particularly a steering assistance pump.

Pumps for the purposes of steering assistance are usually of the rotary vane pump type, comprising a housing in which are disposed a pressure plate, a cam ring and a rotor for defining at least one displacement region. The displacement region is divided up into a plurality of chambers by means of vanes which are carried slidably by the rotor. When the rotor is driven in rotation by a shaft, the above-mentioned chambers move between inlet and outlet ports and openings. The inlet ports communicate with a hydraulic fluid supply system while the outlet ports communicate with a hydraulic fluid discharge system, which communicate with each other by way of a flow control valve. The flow control valve includes a spool, a valve spring and a restrictor throttle or orifice at which a pressure drop is taken off and passed to the two sides of the spool. The flow control valve usually also includes a pressure relief valve which responds when a given limit pressure is exceeded and relieves a part of the controlled output flow of the pump, into an internal inlet duct or passage of the pump.

The steering assistance pump is connected by way of an external output service line to a servo steering means which normally passes on the controlled output flow to the tank. However, when the steering assembly is in a position of extreme steering lock, or angle of turn, it may happen that the servo steering means almost shuts off the controlled output flow completely, so that the pressure rises greatly and the pressure relief valve responds. A large amount of power is converted at the pressure relief valve so that there is a substantial rise in the temperature of the hydraulic fluid, especially as the hydraulic fluid is being circulated within the pump. That condition results in the pump suffering from damage and even failure, after a certain period of time.

SUMMARY OF THE INVENTION

An object of the present invention is to provide a pump for steering assistance, which remains operational in spite of a relief flow of fluid within the pump casing.

Another object of the present invention is to provide a pump for steering assistance including means for safeguarding against an increasing hydraulic fluid temperature in the mode in which a pressure relief valve in the pump responds to avoid pressure damage in the system.

Yet another problem of the present invention is to provide a pump for assistance in a steering system, including means for substantially reducing the control pressure of the pump to avoid excessive heating of the pump hydraulic fluid.

Still a further object of the present invention is to provide a steering assistance pump which includes hydraulic fluid temperature-responsive control means for limiting the output pressure of the pump.

In accordance with the present invention, these and other objects are achieved by means of a pump, such as for steering assistance, comprising a casing which is communicated with a tank by way of suitable ducts. The pump further comprises an external output line or conduit which communicates with a servo steering means which in turn communicates with the tank for the return flow thereto of hydraulic fluid. The pump has a flow control valve operable to divide the output flow of the pump, within the pump casing, into a controlled output flow and an excess or by-pass flow which therefore performs no function in the steering assistance system. The controlled output flow of the pump is passed to the servo steering means by way of the above-mentioned output line, while the excess flow is passed to an internal inlet duct in the pump. A pressure relief valve is subjected to the pressure of the controlled output flow and, when a limit pressure value is exceeded, discharges into the internal inlet duct of the pump, with the fluids thus flowing through an internal relief flow path. A temperature sensor valve is disposed in the relief flow path of the pressure relief valve, and is operable to open an outlet passage to the internal inlet duct when the temperature in the relief flow path exceeds a given limit value.

As will be seen in greater detail hereinafter, in the arrangement as set forth above in accordance with the invention, the temperature sensor valve operates in parallel relationship with respect to the pilot control pressure valve and greatly reduces the control pressure of the pump, thereby avoiding a further heating of the pump. When the steering valve opens again, oil again begins to flow through the servo means and thus through the system, the temperature in the pump falls again, the temperature sensor valve closes and the pump can then again build up the necessary pressure.

Further objects, features and advantages of the present invention will become more clearly apparent from a description of a preferred embodiment with reference to the accompanying drawings.

DESCRIPTION OF PREFERRED EMBODIMENTS

Figure 1:
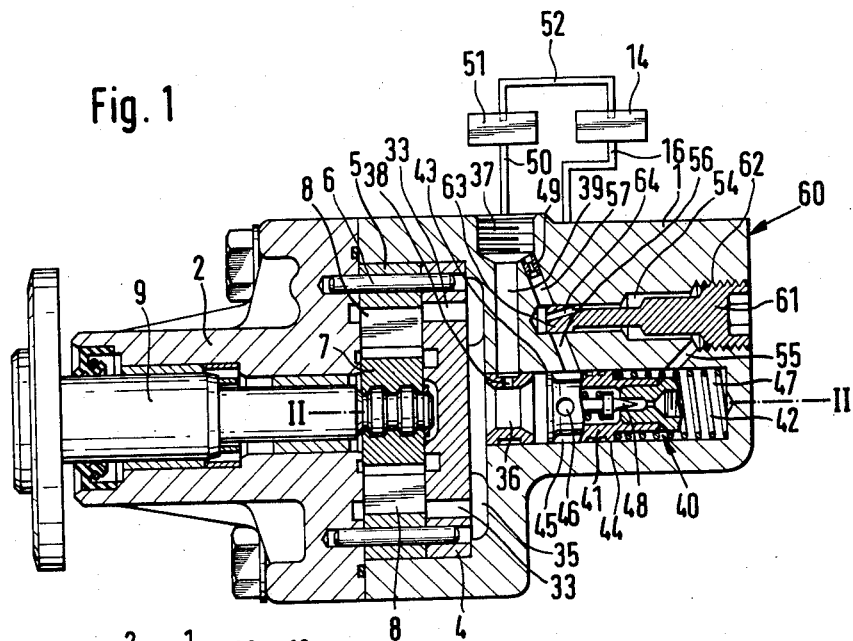
FIG. 1 is a view in longitudinal section through a rotary vane pump according to the invention.
Figure 2:
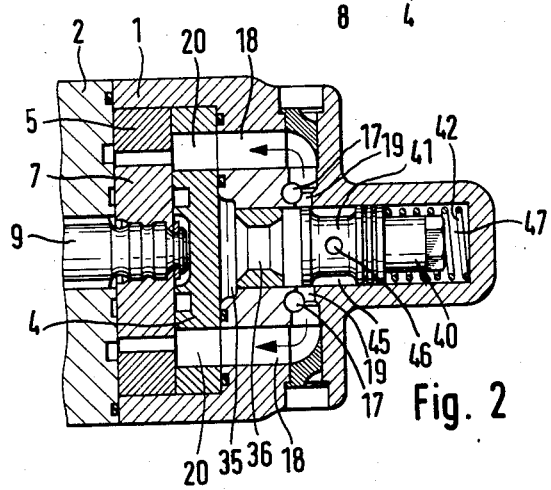
FIG. 2 is a view in cross-section taken along line II—II in FIG. 1.

Referring firstly to FIGS. 1 and 2, shown therein is a pump for steering system assistance, in the form of a rotary vane pump, having a casing comprising a main casing portion 1 and a housing cover portion 2 which are pressure fluid-tightly connected together to define an internal cavity or chamber. Disposed on the chamber in the casing and fixed with respect thereto are a pressure plate 4 and a cam ring 5. The pressure plate 4 and the cam ring 5 are prevented from rotating relative to the casing by means of pins at 6 passing through the pressure plate 4 and the cam ring 5. Disposed within the cam ring 5 and between the casing cover portion 2 and the pressure plate 4 is a rotor 7 which has a plurality of radial guide slots. Vanes 8 are radially slidably mounted within respective ones of the guide slots in the rotor 7.

The rotor 7 is arranged to be driven by way of a shaft 9 which is supported in a mounting bore in the casing cover portion 2. The rotor 7 is of a cylindrical configuration while the cam ring 5 defines an opening therewithin which is of approximately oval internal configuration, with the minor axis thereof approximately corresponding to the diameter of the rotor while the major axis defines the distance by which the vanes 8 can extend from their respective guide slots in the rotor 7. In that way, defined between the internal surface of the cam ring 5 and the outside surface of the rotor 7 are two generally sickle-shaped displacement regions which are subdivided by the vanes 8 into a plurality of cell spaces or chambers. At the suction side of the system defined by the above-described components, the cell spaces or chambers increase in size while at the pressure side they decrease in size.

From a tank diagrammatically indicated at 14, a distributor line or conduit 16 leads into two supply passages or ducts 17 which are in the form of perpendicular bores, as can be seen from FIG. 2, and which each open tangentially into a horizontal, elbow-bent supply passage portion 18. The supply passage portions 18 each have a radial part which opens into a relief passage 19. The axial parts of the supply passage portions 18 meet through openings 20 in the pressure plate 4, from which the flow of hydraulic fluid is divided into the sickle-shaped displacement regions of the pump.

The discharge of hydraulic fluid takes place by way of passages or ducts 33 as shown in FIG. 1, through the pressure plate 4, to the rear side thereof into a pressure chamber 35 and from there into a venturi throat 36. In the venturi throat 36, the pump delivery or output flow is divided into a control output flow to the outer pump outlet 37, and an excess flow through a flow control valve 40 into the passages 19. The controlled output flow passes through a restrictor means or orifice 38 into a discharge passage 39 which communicates with a control chamber 47 of the valve 40, by way of a throttle means or orifice 49.

The valve has a bore which extends in the axial direction of the pump and in which a spool 41 is axially displaceably disposed. The valve 40 further has a spring shown in the form of a coil spring at 42 which urges the spool 41 towards the venturi throat 36 whereat it can possibly come into a condition of abutment. The spool 41 has first and second collar-like sealing regions or lands 43 and 44, between which extends an annular groove 45. The annular groove 45 communicates with the relief passages 19.

A passage 46 which extends partly radially and partly axially goes from the annular groove 45 through the body of the spool 41 into the control chamber 47, and the passage 46 is governed by a spring-loaded valve such as a poppet valve 48 which is opened when a limit pressure in the control chamber 47 is exceeded, so that the high pressure can be relieved into the relief passage 19 by way of the passage 46 and the annular groove 45. The valve 48 thus represents a pressure limiting or pressure relief valve which moreover also controls the position of the spool 41 as, by virtue of the orifice 49, the pressure in the control chamber 47 drops and the high pressure in the venturi throat 36 predominates, with respect to the spring force of the spring 42, as shown in FIG. 2. In that situation, the pressurised hydraulic fluid springs in a jet into the passages 19 and 18, as indicated by the arrows shown in FIG. 2, and produces a suction force in the supply passages or ducts 17 which communicate with the tank 14. The passages or ducts 17 can therefore be referred to as injector means. However, hydraulic fluid is only sucked along when hydraulic fluid flows away at the outer pump outlet 37 by way of an output service line 50, a servo steering means 51 and a tank line 52. If the servo steering means 51 is completely or almost completely shut down, thus almost or entirely blocking off the flow of hydraulic fluid, the hydraulic fluid is substantially circulated in the interior of the pump and thus reaches considerable temperatures which could even result in damage to and failure of the pump.

Therefore, the pump assembly includes a temperature sensor valve 60 which operates in parallel relationship to the pressure relief valve 48. The temperature sensor valve 60 includes a rod or bar 61 which is gripped in the pump casing portion 1 at the location indicated at 62 and which extends freely in a bore 54 which communicates with the control chamber 47 by way of a further bore 55. At its free end, being the end which is towards the left for example in FIG. 1, the member 61 carries a closure element 63 which is arranged to close off a bore 56 in the casing portion 1. The bore 56 communicates with the annular groove 45 between the lands 43 and 44 of the spool 41, and also communicates with the supply passage portion 18 by way of the relief passage 19. The member 61 comprises a material having a low degree of thermal expansion, for example nickel iron, if the material of the pump casing portion 1 has a higher degree of thermal expansion, comprising for example aluminium, while when the material of the housing is grey cast iron, the member 61 is made from aluminium.

Provided in the member 61 is a duct or passage indicated at 64 and formed for example by a suitable groove or bore and which connects the bore 54 in which the member 61 is disposed, to a bore 57 in which the orifice 49 is disposed, so that the control chamber 47 is communicated with the pump outlet port 37 by way of the flow path 55, 54, 64, 57 and 49.

The width of the land 43 is smaller than the width of the opening 19. Therefore, communication between the spaces 36 and 19 as well as between 45 and 19 is possible. Just before the relief valve 44 opens, communication exists between groove 45 and passage 19. Accordingly, a relief flow through the path 47, 48, 46, 45 to 19 is possible. If the valve spool 41 moves to the right, closing such communication, pressure in space 36 falls allowing the spool 41 to go back to its position wherein a communication between 45 and 19 exists. It is noted that the pump is still displacing fluid and the load 51 is practically shutting off the fluid flow through the output line 50, creating further high pressure which is relieved through valve 48 until the load goes to its normal condition.

If the pressure relief valve 48 responds in the manner referred to above by virtue of the pressure of the hydraulic fluid exceeding the set limit value, a relief flow path is formed by 39, 37, 49, 57, 64, 54, 55, 48, 46, 45 and 19, and because of the considerable energy conversion effect which then occurs, the temperature of the hydraulic fluid rises substantially. The member 61 has the hot hydraulic fluid passing therearound. As a result of the low degree of thermal expansion of the member 61 with respect to the housing 1, the closure element carried at 63 by the member 61 at the free end thereof opens a gap leading into the bore 56 so that hydraulic fluid can escape from the control chamber 47 and the bore 57, and flows by way of the passage 19 to the suction intake side of the pump. As a result of that, the pressure in the control chamber 47 is reduced and the spool 41 moves further in the direction of opening. That causes the outlet pressure of the pump to be greatly reduced, so that the energy conversion effect is decreased and further heating of the pump prevented.

Figure 3:
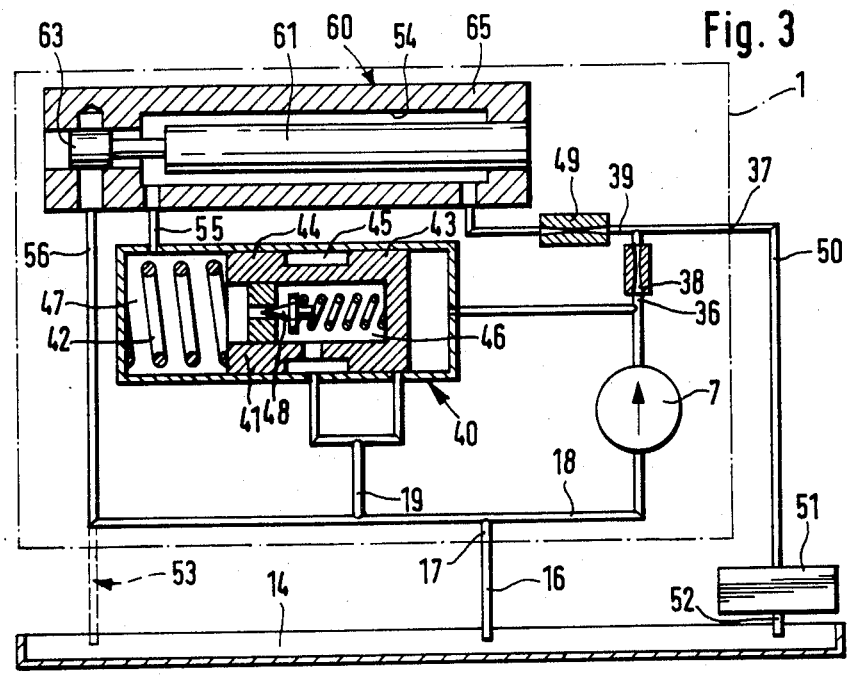
FIG. 3 is a hydraulic circuit diagram.

Reference will now be made to FIG. 3 showing a diagrammatic view of a circuit including a steering assistance pump with a servo steering means connected thereto. Corresponding components in FIG. 3 are denoted by the same references as those used in the description relating to FIGS. 1 and 2. Thus, the pump assembly once again has a thermal expansion means or temperature sensor valve indicated generally by 60, comprising a bar or rod member 61 and an elongate housing wall portion which is formed as a slide sleeve 65 and which can expand within the pump casing portion 1. The material of the bar 61 and the sleeve 65 is distinguished in that it has the maximum possible difference in regard to coefficient of thermal expansion.

The outlet flow path which goes by way of the bore 56 to the passage or duct arrangement 18 and 19 may also be taken by way of the tank 14, as shown by the broken line indicating the output service line 53. In that case, the hot fluid which is discharged by way of the line 53 is replaced by fresh, normally cooler fluid which is drawn in from the tank by way of the distributor line or conduit 16. This construction is particularly advantageous from the functional point of view as the condition of operating output readiness of the pump at the servo steering means 51 can be maintained, particularly if the orifice 49 is disposed in the passage 55 and the direct communication between the bores 56 and 19 is given up. However, the separate line 53 frequently makes it necessary to modify the tank 14.

Figure 4:
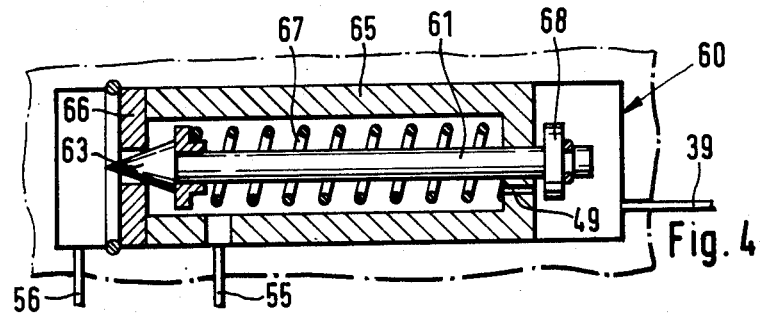
FIG. 4 shows an alternative form of a detail from FIG. 3.

Reference will now be made to FIG. 4 showing a further embodiment of the temperature sensor valve 60. The slide sleeve 65 comprises aluminium and has a valve seating plate 66 comprising steel. The rod or bar member 61 comprises nickel iron and is guided displaceably in the sleeve 65. A spring 67 urges the member 61 with its closure element 63 towards the valve seating plate 66. Aluminum sleeve 65 expands by heat, and a nickel iron rod 61 practically does not expand. There is a lost motion for sleeve 65 to expand until an abutment 68 is reached. Thereafter, further expansion will move the rod 61 to the right and open the sensor valve 60. After the temperature sensor valve 60 begins to heat up, abutment 68 on the member 61 engages against the sleeve 65 so that further expansion thereof results in the temperature sensor valve progressively opening. By virtue of that opening of the valve, a branch flow of the hydraulic fluid can be passed to the suction intake line, whereby the pump pressure is again reduced.

Figure 5:
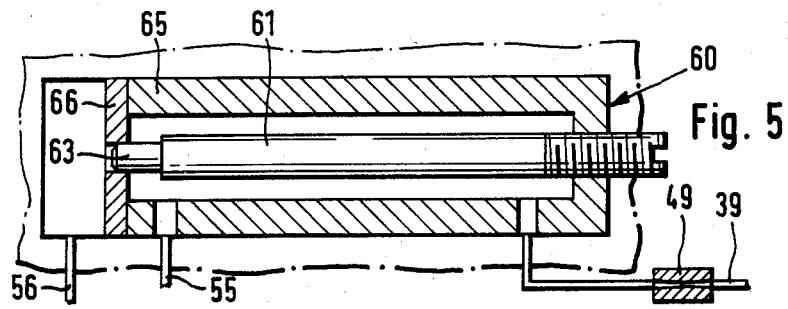
FIG. 5 shows another alternative form of a detail.

Reference will now be made to FIG. 5 showing a further embodiment of the temperature sensor valve 60. The bar or rod member 61 which comprises for example nickel iron is screwed into the sleeve 65 which comprises for example aluminium, and the closure element 63 extends slightly into the opening in the valve seating plate 66 which comprises steel. When the aluminium of the sleeve 65 expands due to an increase in temperature, the valve opening is opened a little, and a partial flow is branched off to the suction intake line of the pump.

The sleeve 65 may be part of the pump casing, that being a construction which can be considered in particular when the pump casing comprises aluminium.

It will be appreciated that the above-described embodiments have been set forth solely by way of example of the present invention, and that further modifications and alterations may be made without thereby departing from the scope of the invention.

What is claimed is:

1. A pump for creating a fluid flow comprising:
   a casing;
   inlet duct means to provide a communication of the pump with a tank;
   an output line to provide a communication of the pump with a load;
   valve means including a flow control valve for dividing said fluid flow of the pump within said pump casing into a controlled output flow and an excess flow;
   passage means for carrying said controlled output flow to said output line;
   said inlet duct means including an internal inlet passage for carrying an inlet flow of fluid for the pump, disposed internally of said casing;
   bypass passage means for carrying said excess flow to said internal inlet passage;
   said valve means also including a pressure relief valve having a control chamber connected through a pressure sensing passage to said output line and being subjected to the pressure of said controlled output flow;
   said pressure relief valve being operable when a limit pressure in said control chamber is exceeded to relieve a relief fluid flow under pressure through relief passage means and said bypass passage into said inlet passage, said relief fluid flow passing through said pressure sensing passage before entering in said relief valve, said relief passage means and said bypass passage means;
   and a temperature sensor valve disposed in said pressure sensing passage and operable to open a flow passage to said inlet duct means when the temperature in said pressure sensing passage exceeds a limit value.

2. A pump as set forth in claim 1 wherein said temperature sensor valve includes a thermal expansion means and a closure element which is operable in the normal operating mode of the pump to close said flow passage to said inlet duct means.

3. A pump as set forth in claim 2 wherein said thermal expansion means comprises an elongate wall means and an elongate bar member extending therewithin.

4. A pump as set forth in claim 3 wherein said wall means and said bar member comprise materials having substantially different coefficients of thermal expansion.

5. A pump as set forth in claim 4 wherein said wall means of said thermal expansion means comprises a sliding sleeve having a high coefficient of thermal expansion.

6. A pump as set forth in claim 4 wherein said bar member comprises nickel iron.

7. A pump as set forth in claim 5 wherein said bar member comprises nickel iron.

8. A pump as set forth in claim 3 wherein said bar member is gripped in said wall means.

9. A pump as set forth in claim 5 wherein said bar member is gripped in said sliding sleeve.

10. A pump as set forth in claim 3 wherein said bar member is guided in said wall means and carries an abutment means thereon.

11. A pump as set forth in claim 5 wherein said bar member is guided in said sleeve and carries an abutment means thereon.

12. A pump as set forth in claim 1 wherein said flow passage to said inlet duct means goes by way of said tank.

13. A pump as set forth in claim 1 wherein said valve means is of an elongate configuration and has a pressure chamber and a control chamber with a duct means providing a coummunication therebetween, and wherein said temperature sensor valve extends substantially parallel to the longitudinal direction of the valve means and forms a portion of said communication duct means.

14. A system including a pump as set forth in claim 1 wherein said load is a steering means and said pump is operable as a steering assistance pump.

* * * * *